No. 857,670. PATENTED JUNE 25, 1907.
J. G. REDFORD.
OVEN FOR HEATING FLAT IRONS.
APPLICATION FILED OCT. 24, 1903.

Witnesses:
Geo. H. Willetts
H. C. Lynch

Inventor:
Jno. G. Redford

UNITED STATES PATENT OFFICE.

JOHN G. REDFORD, OF MILWAUKEE, WISCONSIN.

OVEN FOR HEATING FLAT-IRONS.

No. 857,670.  Specification of Letters Patent.  Patented June 25, 1907.

Application filed October 24, 1903. Serial No. 178,421.

*To all whom it may concern:*

Be it known that I, JOHN G. REDFORD, a citizen of the United States, residing at the city of Milwaukee, in the county of Milwaukee and State of Wisconsin, have invented a new and useful Oven for Heating Flat-Irons, of which the following is a specification.

This device, is designed to be used in heating flatirons and by means of this device flat-irons can be heated with greater economy and in shorter time than with any other device now in use as far as I am aware.

My device is a portable oven of suitable size, and is constructed so that it may be placed upon any kind of a stove or heating apparatus used for heating flatirons, toasting, etc., and is especially intended for use upon stoves using gas or vapor fuel. The oven is made by a combination of a bottom plate and a cover hinged thereto, and having a lever attached to the bottom for raising the cover. The cover is of sufficient height to allow flat-irons to be placed underneath it.

Figure 1:
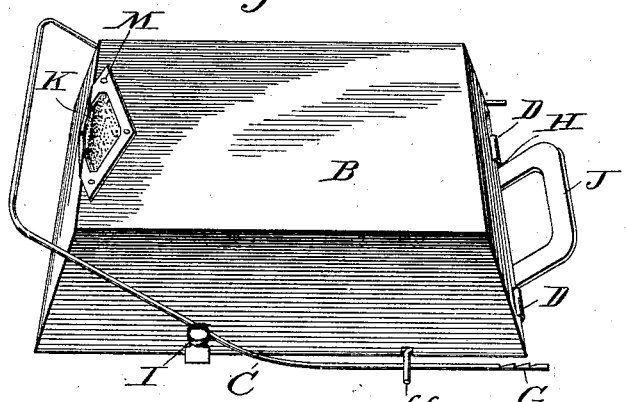
Figure 2:
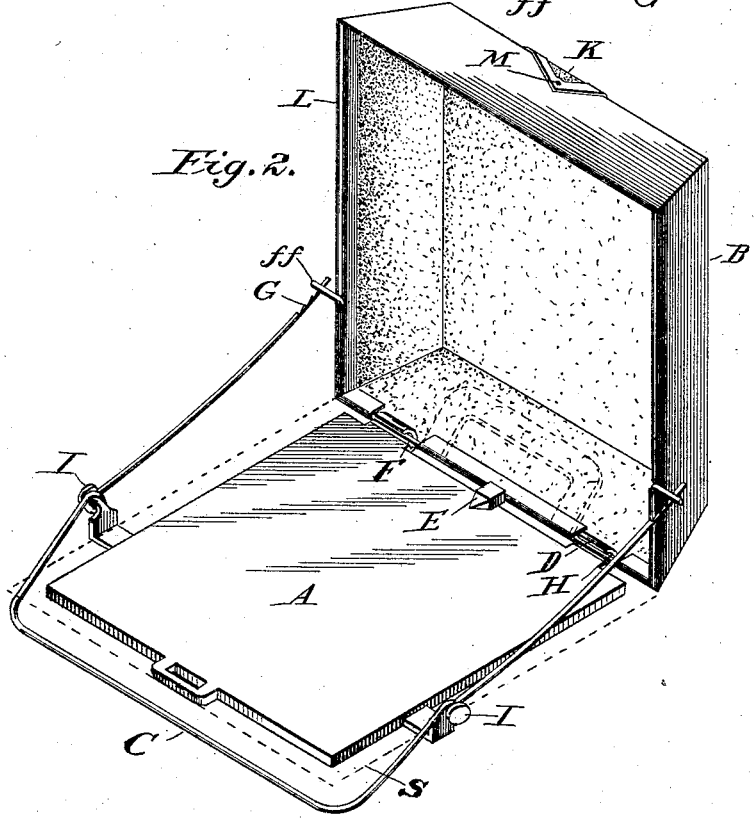

In the drawing Figure 1 indicates a perspective view of the oven with the cover closed. Fig. 2 indicates a perspective view of the oven showing the cover raised.

Similar letters of reference represent similar parts.

"A" is the bottom of the oven which is preferably made of cast material; "D" indicates up-turned hooks projecting from and forming a part of the bottom "A" and are used as part of the hinge to attach the cover "B" to the bottom "A."

"E" is a stop block projecting from and forming a part of the bottom and serving the purpose of preventing the cover from becoming detached.

The hooks "D" and stop block "E" extend such a distance beyond the rear edge of the bottom plate that the rear edge of the cover is suitably spaced from the rear edge of the bottom plate.

"J" is a loop projecting from the rear of the bottom and rising above the plane of the bottom and forming a rest for the cover "B" when the oven is open.

"B" is the cover of the oven. (This cover is preferably formed of sheet iron but may be formed of any suitable material.) The cover is slightly larger in diameter than the bottom "A" as shown by dotted line "S," leaving around all sides of the bottom "A" a space between the bottom and the cover when the cover is closed, thus forming an inlet space for heated gases. The cover may be lined with asbestos or other suitable material which is a non-conductor of heat.

"F" is a wire bound into the lower rear edge of the cover "B" and extending along the sides from the rear to a suitable point where it is bent out at right angles to the sides and forms the supports "*ff*" used in connection with the lever "C."

"C" is a U shaped lever used for raising the cover of the oven. The closed end of the lever "C" passes in front of the oven and the ends of the lever "C" extend rearwardly over "I" which are projections upon the sides of the bottom "A" and under the supports "*ff*." Lever "C" is in pivotal relation with projection "I."

"G" indicates notches in the upper side near the ends of the lever "C" where the same pass under the supports "*ff*."

The lever "C" is operated by depressing the closed end of "C," the said lever "C" oscillating upon "I" which form fulcrums for the lever. The ends of the lever "C" being thus raised, tilt the cover "B" rearwardly until the notches "G" engage the supports "*ff*" and holds the cover open.

"H" indicates notches cut in the cover "B" opposite the upturned hooks "D." In cutting these notches "H" the wire "F" bound into the hem "L" is left exposed. The cover "B" is attached to the bottom "A" by inserting the wires "F" into the upturned hooks "D" and springing the edge of the cover "B" between the notches "H" up over the stop block "E" so that the wires "F" will pass to the bend of the upturned hooks "D" when the center part of the edge will spring down back of the stop block "E" thus forming a hinge.

Upon the front of the top of the cover "B" is a shield "K" of asbestos felt. This serves the purpose of protecting the hand of the person using the oven, in closing the cover "B." The asbestos lining of the cover "B" is held in place, at the bottom, by a hem "L," which is made by turning up the bottom edge of the cover "B" a suitable width.

"M" are rivets which extend through the shield "K," the cover "B" and the asbestos lining and help to hold the asbestos lining in position in the cover "B."

Having thus described all that is necessary to a full understanding of my invention, what I claim as new, is:

1. In an oven of the class described the combination of a bottom plate provided at its sides with projections adapted to form fulcrums, a cover provided with supports hinged to said bottom, said cover having a lining of asbestos or other suitable material which is a non-conductor of heat, said cover being of greater diameter than the bottom and adapted to form therewith when closed an inlet space for heated gases, a U shaped lever fulcrumed on said projections and having its closed portion extending beyond the front portion of the oven and its free ends extending beneath said supports, said free ends being provided with notches adapted to engage said supports and said lever being adapted to be operated to open said cover and to hold the same in open position.

2. In an oven of the class described the combination of a bottom plate provided on its rear edges with projecting up turned hooks and a projecting stop block between said hooks, said stop block and said hooks such a distance beyond the rear edge of the bottom plate that the edge of the cover is suitably spaced from the rear edge of the bottom plate, a cover of greater diameter than the bottom plate and adapted to form therewith an inlet space for heated gases, said cover having notches cut in the lower rear edge opposite the upturned hooks on said bottom plate a wire bound into the lower rear edges of the cover and extending across the notches cut in said cover said upturned hooks and said wire across said notches forming a hinge connecting the cover and the bottom plate.

In testimony whereof I have signed my name to this specification in the presence of two subscribing witnesses.

JNO. G. REDFORD.

Witnesses:
   GEO. H. WILLETTS,
   H. C. LYNCH.